(12) United States Patent
Parker et al.

(10) Patent No.: US 8,671,438 B2
(45) Date of Patent: Mar. 11, 2014

(54) METHOD AND SYSTEM FOR MANAGING SECURITY OF MOBILE TERMINAL

(75) Inventors: Benjamin Parker, Foster City, CA (US); Steven R. Rados, Danville, CA (US)

(73) Assignee: Cello Partnership, Basking Ridge, NJ (US)

( * ) Notice: Subject to any disclaimer, the term of this patent is extended or adjusted under 35 U.S.C. 154(b) by 992 days.

(21) Appl. No.: 12/078,741

(22) Filed: Apr. 4, 2008

(65) Prior Publication Data

US 2009/0254969 A1 Oct. 8, 2009

(51) Int. Cl.
- G06F 21/00 (2013.01)
- G06F 17/00 (2006.01)
- G08B 23/00 (2006.01)

(52) U.S. Cl.
USPC .......... 726/1; 726/13; 726/25; 455/410; 455/411; 370/357

(58) Field of Classification Search
USPC .......... 713/100; 455/432.1, 436, 410, 411; 380/270; 726/1, 11, 12, 13–14, 22–25; 370/357

See application file for complete search history.

(56) References Cited

U.S. PATENT DOCUMENTS

| | | | | |
|---|---|---|---|---|
| 6,920,558 | B2 * | 7/2005 | Sames et al. | 713/166 |
| 7,200,390 | B1 | 4/2007 | Henager et al. | |
| 7,418,253 | B2 * | 8/2008 | Kavanagh | 455/410 |
| 2002/0072358 | A1 * | 6/2002 | Schneider et al. | 455/423 |
| 2002/0160811 | A1 * | 10/2002 | Jannette et al. | 455/560 |
| 2003/0027551 | A1 * | 2/2003 | Rockwell | 455/410 |
| 2003/0084321 | A1 * | 5/2003 | Tarquini et al. | 713/200 |
| 2003/0110392 | A1 * | 6/2003 | Aucsmith et al. | 713/200 |
| 2004/0127195 | A1 * | 7/2004 | An | 455/410 |
| 2005/0141527 | A1 * | 6/2005 | Gateva et al. | 370/401 |
| 2006/0013191 | A1 * | 1/2006 | Kavanagh | 370/349 |
| 2006/0085543 | A1 | 4/2006 | Hrastar et al. | |
| 2006/0128406 | A1 * | 6/2006 | Macartney | 455/466 |
| 2006/0173991 | A1 | 8/2006 | Piikivi | |
| 2006/0218395 | A1 * | 9/2006 | Maes | 713/167 |
| 2006/0224742 | A1 * | 10/2006 | Shahbazi | 709/226 |
| 2006/0276173 | A1 * | 12/2006 | Srey et al. | 455/410 |
| 2007/0077931 | A1 * | 4/2007 | Glinka | 455/445 |
| 2007/0123216 | A1 * | 5/2007 | Cantini et al. | 455/411 |
| 2007/0143824 | A1 * | 6/2007 | Shahbazi | 726/1 |
| 2007/0150934 | A1 * | 6/2007 | Fiszman et al. | 726/1 |
| 2007/0197163 | A1 * | 8/2007 | Robertson | 455/26.1 |
| 2007/0204326 | A1 * | 8/2007 | Bocking et al. | 726/1 |
| 2007/0233861 | A1 * | 10/2007 | Cai et al. | 709/225 |
| 2007/0294744 | A1 * | 12/2007 | Alessio et al. | 726/1 |
| 2008/0148402 | A1 * | 6/2008 | Bogineni et al. | 726/22 |

OTHER PUBLICATIONS

Atique Ahmed Khan, Security & Vulnerability Analysis of Wireless Messaging Protocols & Applications, pp. 1-20, www.pakcon.org, 2004.*
Pasi Ahonen et al, Information Security Threats and Solutions in the Mobile World, pp. 1-108, VTT Research Notes, 2005.*

* cited by examiner

Primary Examiner — David Garcia Cervetti
Assistant Examiner — Shanto M Abedin

(57) ABSTRACT

A method for enabling security on a mobile terminal having a communication link with a circuit switched network against suspicious activities is provided. Activities performed at the mobile terminal are performed according to a security policy provided from the circuit switched network. Detection of a suspicious activity is alerted to the circuit switched network when the suspicious activity is detected. A policy manager server of the circuit switched network changes the security policy to cure the suspicious activity on the mobile terminal. Call traffic delivered to/sent from the mobile terminal is filtered out, which causes the suspicious activity according to the security policy. The mobile terminal enforces a security measure on a suspicious activity according to the security policy.

11 Claims, 3 Drawing Sheets

METHOD AND SYSTEM FOR MANAGING SECURITY OF MOBILE TERMINAL

TECHNICAL FIELD

The present subject matter relates to techniques and equipment to provide security to a circuit switched network that provides wireless communication services to a mobile terminal via a radio link, against suspicious activities, by monitoring operations of the mobile terminal.

BACKGROUND

As mobile communications have developed from voice communications to data communications, traffic of data transferred from and to mobile terminals have immensely increased. A mobile handset, called a smart phone, offers advanced capabilities beyond a typical mobile phone, often with PC-like functionality. The types of data delivered to the mobile handset have emerged into diverse forms including text messages, music or movie files. While these enhancements in functions of the mobile handsets offer diverse sophisticated services, they require a huge amount of data to be delivered to and sent from the mobile handsets and make the mobile handset vulnerable to suspicious or hazardous activities. Furthermore, when the hazardous data spreads from the mobile terminal into a circuit switched network such as a Public Land Mobile Network (PLMN) for providing wireless communication services to the mobile terminal, the ripple effect of the hazardous data on subscribers to the PLMN cannot be compared with that on mobile terminal users.

Efforts have been made to cure or prevent the hazardous data from spreading only inside the circuit switched network on the network components' side. Such efforts are not adequately responsive to spread of the hazardous data from or through the mobile terminal.

In this context, it is desirable to enforce such security policies on the mobile terminal, which is a source to spread hazardous data traffic to the circuit switched network, in order to enhance efficiency of the security enforcement.

SUMMARY

The teachings herein offer improvements relating to providing security to a circuit switched network that delivers wireless communication services to a mobile terminal via a radio link against suspicious activities of the mobile terminal.

The teachings below encompass a method for enabling security on a mobile terminal having a communication link with a circuit switched network against suspicious activities. Activities performed at the mobile terminal are monitored according to a security policy, which is enforced by an execution of a security agent software provided from the circuit switched network via the communication link between the mobile terminal and the circuit switched network. Detection of a suspicious activity defined by the security policy is alerted to the circuit switched network when the suspicious activity is detected. The security policy is changed to address the suspicious activity detected at the mobile terminal. For that purpose, a policy manager server of the circuit switched network sends the changed security policy to the mobile terminal via the communication link between the mobile terminal and the circuit switched network.

Call traffic delivered to/sent from the mobile terminal to cause the suspicious activity by a message server of the circuit switched network are filtered out according to the security policy. The call traffic is in the form of Short Message Service (SMS) or Multimedia Message Service (MMS) messages.

Examples of suspicious activities include a PING attack, a User Datagram Protocol (UDP)/Transmission Control Protocol (TCP) port scanning, a SYN flood, a malformed packet attack, a inverse network mapping, and a predatory remote access to the mobile terminal.

The mobile terminal enforces a security measure on a suspicious activity according to the security policy.

Another aspect of the disclosure encompasses a method for enabling security to a mobile terminal having a communication link with a circuit switched network against suspicious activities. Activities performed at the mobile terminal are monitored according to a security policy enforced by an execution of a security agent software downloaded from the circuit switched network via the communication link with the circuit switched network. A security measure is enforced on a suspicious activity according to the security policy at the mobile terminal when the suspicious activity is detected.

The security policy is provided from the circuit switched network, and the security policy is updated to restrict delivery of data which causes the suspicious activities in the mobile terminal.

In a specific example, the security measure may include one or more of restricting bandwidth consumption, control of application program, restriction on time of access to resources on the mobile terminal, and restriction on phone number to contact.

Another aspect of the disclosure encompasses a mobile terminal having a communication link with a circuit switched network. The mobile terminal comprises a microprocessor, and a memory storing a security agent software.

The execution of the security agent software by the microprocessor causes the mobile terminal perform functions of monitoring activities performed at the mobile terminal according to a security policy which is enforced by an execution of the security agent software. The software may be provided from the circuit switched network via the communication link between the mobile terminal and the circuit switched network. The functions further include alerting detection of a suspicious activity defined by the security policy to the circuit switched network when the suspicious activity is detected, and changing the security policy to address the suspicious activity detected at the mobile terminal by a policy manager server of the circuit switched network and sending the changed security policy to the mobile terminal via the communication link between the mobile terminal and the circuit switched network.

Another aspect of the disclosure encompasses a system for enforcing security policy on a mobile terminal and a circuit switched network having a communication link with the mobile terminal. The system comprises the mobile terminal having a security agent software, by execution of which the mobile terminal performs functions of monitoring activities performed on the mobile terminal and alerting a detection of a suspicious activity to the circuit switched network via the communication link with the circuit switched network when the suspicious activity is detected. The security agent software is downloaded from the circuit switched network.

A message control server controls delivery of data for the mobile terminal according to the security policy stored in the server. The security policy is updated to filter out data which relates to the suspicious activity at the mobile terminal, upon reception of the alert of the detection of the suspicious activity from the mobile terminal.

The system may further include a policy manager server for updating the security agent module to reflect the updated security policy and for sending the updated security agent module to the mobile terminal. The security agent module monitors SMS/MMS messages delivered to or sent from the mobile terminal.

In a specific example, the suspicious activity may include acts such as a PING attack, a UDP/TCP port scanning, a SYN flood, a malformed packet attack, a inverse network mapping, and a predatory remote access to the mobile terminal.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein provide security measures enforced on a mobile terminal and/or on message traffic for the terminal through a circuit switched network, against suspicious activities. A security function, implemented by security agent (SA) software, on the mobile terminal itself measures, and/or monitors activities performed at the mobile terminal according to a security policy provided from the circuit switched network. Detection of a suspicious activity is alerted to the circuit switched network. A policy manager server of the circuit switched network changes the security policy to cure the suspicious activity on the mobile terminal. The security agent software also may be downloaded from the network. Call traffic delivered to/sent from the mobile terminal, which causes the suspicious activity, is filtered out according to the security policy. Filtering may be implemented by the SA software in the mobile terminal. Filtering also may be implemented in the circuit switched network, e.g. at or in association with a message center.

Figure 1:
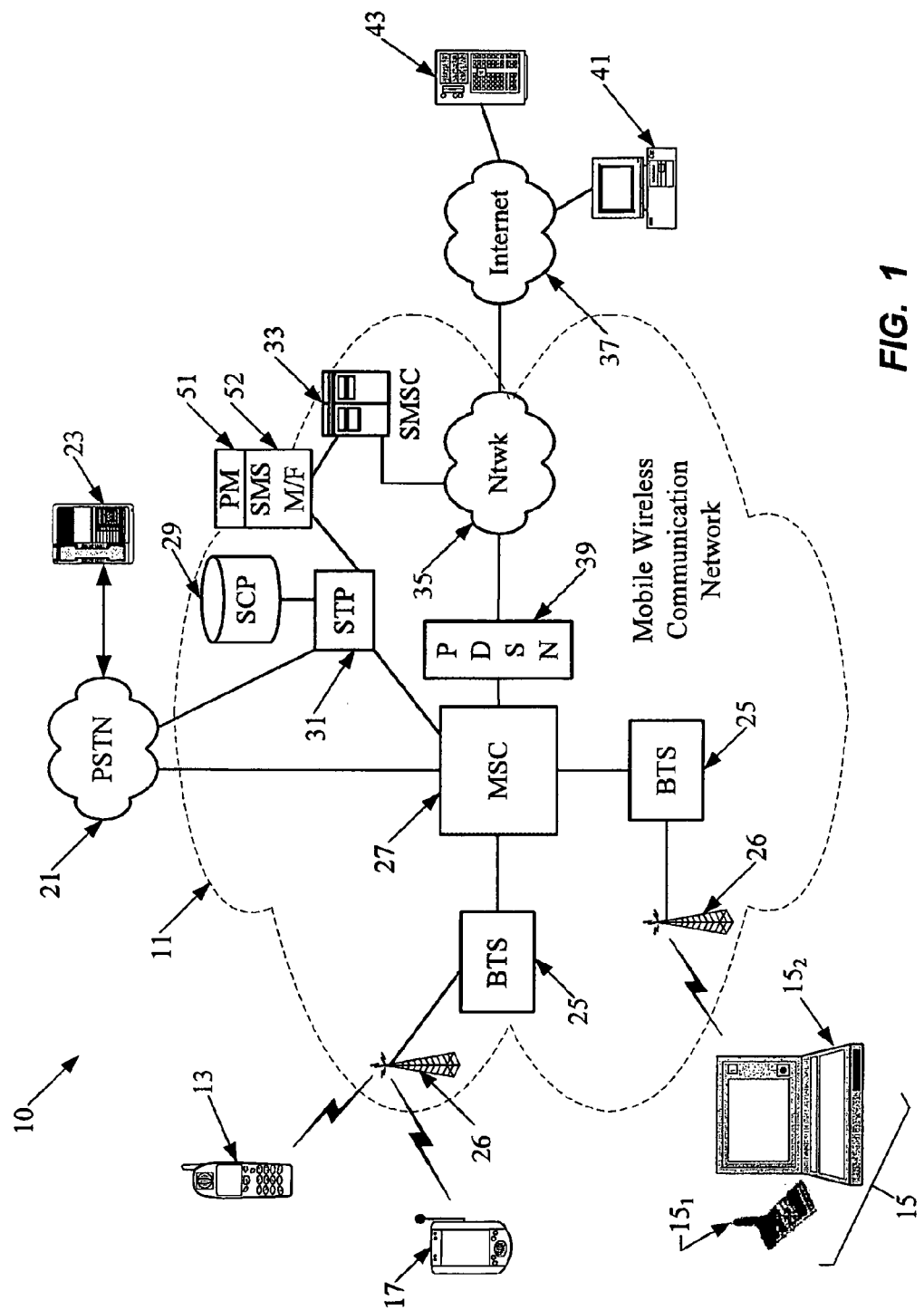
FIG. 1 is a functional block diagram of telecommunication networks and components, which may implement security measures on the mobile terminals and the telecommunication networks.

FIG. 1 is a functional block diagram of a system 10 comprising telecommunication networks and components, which may implement security measures on the mobile terminals and the telecommunication networks. Before discussing implementation of the security, it may be helpful to consider the general arrangement and operations of the system 10.

The communication network 11 provides mobile voice telephone communications as well as packet data services, for numerous mobile terminals. For purposes of later discussion, three kinds of mobile terminals 13, 17, 19 appear in the drawing; each operated by a different user. The mobile terminals 13, 17, 19 represent the general class of mobile terminals that operate via the public cellular network 11.

The network 11 enables users of the mobile terminals to initiate and receive telephone calls to each other as well as through the Public Switched Telephone Network (PSTN) 21, for example for communications with landline telephone devices 23. The network 11 also enables users of the mobile terminals 19 to initiate and receive various data communications to the public data network referred to as the Internet 37. Such data communications allow users of the mobile terminals to send or receive data to or from other digital devices (represented by way of example by a PC 41 and a host computer or server 43) that otherwise have access to the Internet 37. The data communications typically provide transport for the various information in Internet Protocol (IP) packets, for routing or packet switching communications through Intranets (not shown) or through the Internet 26. This enables communications with a variety of other data devices, such as servers, hosts and personal computers coupled to the Internet. The network 11 provides the various wireless communication services in accord with a digital radio protocol, although for voice telephone services, the network may also support a legacy analog protocol.

The mobile terminals 13, 17, 19 may take many forms. For example, some mobile terminals may be enhanced mobile telephone stations 13 with display and user input capabilities to support certain text and image communications in the form of SMS and MMS messages, for example, for e-mail, music or motion pictures viewing, and web browsing applications. Today, such enhanced mobile telephones 13 typically take the form of portable handsets, although they may be implemented in other form factors. Other mobile terminals may comprise Portable Digital Assistants (PDAs) 17 with built-in wireless communication capabilities and possibly a voice interface. As another alternative, a wireless device such as network interface card or even a mobile telephone $15_1$ having data communication capabilities may be connected to or integrated into a portable computing device $15_2$, such as a hand-held or laptop type computer.

In the example, the mobile wireless communication network 11 is a cellular type network including a fixed circuit switched network components. Physical elements of a Radio Access Network (RAN) portion thereof include a number of base stations represented in the example by the Base Transceiver Systems (BTSs) 25, which communicate via antennae 26 and the air-link with the mobile terminals 17, when within range. A base station typically includes a BTS 25 coupled to several antennae 26 mounted on a radio tower within a coverage area often referred to as a "cell." The BTS 25 is the part of the radio network that sends and receives RF signals to/from the mobile terminals 17 that the base station currently serves.

A typical current example of the network 11 also includes a number of radio access network switches. The drawing shows one such switch 27. The switches 27 typically are modern versions of Mobile Switching Centers (MSCs) or Mobile Telephone Switching Offices (MTSOs), which support both cellular voice and packet data services. Each MSC switch 27 connects through trunk circuits to a number of the BTS base station transceivers 25, which the respective switch serves and controls.

The exemplary network 11 includes a centralized node sometimes referred to as a Service Control Point (SCP) 31. The SCP 31 communicates with the MSCs 27 via data links and one or more Signaling Transfer Points (STPs) 27 of an out-of-band signaling system, typically, a Signaling System 7 (SS7) network.

The BTS 25 at a base station assigns and reassigns channels to the mobile terminals 13, 17, 19 that it serves and monitors the signal levels to recommend hand-offs to other base stations.

The network 11 also includes a number of Packet Data Serving Nodes (PDSNs). The PDSN 39 is a fixed network element introduced in the architecture for 3G networks, to support packet-switched data services. The interface between a cdma2000-1x radio access network and a PDSN is called the R-P Interface, for example, between the PDSN 20 and the MSC 27.

Each PDSN 39 establishes, maintains and terminates logical links to the associated portion of the radio access network 11, across the respective R-P interface. The PDSNs 39 also support Point To Point (PPP) sessions with the mobile terminals 13, 17, 19. The PDSNs 39 provide the packet routing function from the respective radio network to/from other packet-switched networks, represented by network 35, in the drawing.

In operation, packet services of the mobile terminals are homed to one PDSN 39, much the same way as they are homed to one serving area, such as an area served by a particular MSC 27; and that PDSN 39 serves as the stations' Home Agent (HA). When roaming, another PDSN 39 serves as a Foreign Agent, in a Mobile IP (MIP) service implementation. The HA ensures smooth seamless hand-off among various PDSNs 39.

The MSC 27 converts the radio protocols into packet protocols to allow the associated PDSN to route packets in standard packet protocols via the internal networks links. Hence, in the example, the MSC 27 relays packets and provides the necessary protocol conversions between radio communications via the base station and the PDSN 39. In some implementations, the MSC 27 provides packet switched communications to/from the PDSN 39.

Hence, the illustrated network 11 in addition to normal cellular type telephone services, supports a range of packet data services. The packet data communications can support traditional data applications, such as browsing the Internet and e-mail communications to/from remote computers such as a server or a personal computer. Some of these services, such as browsing, use a "pull" model in which the station requests and receives desired information. Other services, such as e-mail message receipt notification, entail a data "push" operation in which a data source initiates the transmission (pushes) the information out to the recipient mobile terminal. In wireless networks, a push communication often relies on a notice transmission which activates a routine in the mobile terminal to initiate a session from the mobile terminal that emulates a pull model communication, albeit to obtain the data intended to be pushed out to the mobile terminal. For purposes of the present discussion, the packet data communications through the network 11 also enable the DSUP download operations. The DSUP download operations rely in part on such an implementation of a push communication.

In the example, the PDSN 39 supports MIP addressing for dynamic and static address services. Of course, the wireless network 11 may support other address administration services for mobile terminals, such as Simple IP service. The MIP is a service in which the user's mobile terminals 13,17, 19 are assigned an IP address from a "home" network (e.g., HA). With MIP service, the assigned IP address does not change as the mobile terminals 13, 17, 19 change their point of attachment to the network 11 (e.g. by roaming to a new provider network or by roaming across a PDSN boundary). If dynamically assigned, the IP address remains assigned to the particular mobile terminals 13, 17, 19 until that station logs-off, the station is inactive for longer than some set period, or the data session is otherwise terminated.

As noted earlier, the exemplary network 11 includes a signaling system. Hence, the network 11 also includes a STP 31 coupled to other elements of the network and to elements of the PSTN 21 through SS7 link sets. Although only one is shown for convenience, STPs typically are implemented in mated pairs and interconnect to other pairs of STPs. The STPs and the links thereto provide a signaling network, for use in managing call traffic through the telecommunications networks, e.g. networks 11 and 21.

In addition to links to switches or offices of the networks, the STP 31 provides signaling links to control nodes, such as Service Control Points and to other special service components of the network. Of note for purposes of the present discussion, the STP 31 provides a signaling communication link to an Short Message Service Center (SMSC) 33. The SMSC 33 also connects to an IP network 35 for receiving and possibly sending messages in IP packet format. As discussed more below, the push notification for DSUP download may utilize an SMS communication, via the SMSC 33.

Wireless carriers originally developed the SMS to transmit text messages for display on the mobile terminals 13, 17, 19. MMS messages, which allow sending messages that include multimedia objects (images, audio, video, rich text), may be deployed over the network components as well. The SMSC 33 is a standard messaging computer used in cellular networks today to offer SMS/MMS services to cellular customers. The SMSC 33 receives IP packet communications containing messages, such as e-mail, intended for transmission to mobile terminals 13, 17, 19 and forwards them to the appropriate MSC 27 via the STP 31 and the SS7 signaling link sets. The MSC 27, in turn, transmits each SMS/MMS message over a signaling channel of the radio access network to the intended mobile terminal 13, 17, 19. The SMSC 33 also sends and receives SMS/MMS messages to facilitate exchange of message between mobile terminals. Of note for purposes of the present discussion, the SMS/MMS message transmission technique has been adapted to send notifications to mobile terminals of push data communications, in response to which, the mobile terminals initiate data sessions to obtain the pushed data using procedures that otherwise correspond to push type data services. Those skilled in the art will recognize that other push notification techniques, such as a WAP IP push, could be used.

The network 11 also includes a SMS monitor/filter (M/F) 52 which monitors and filters SMS/MMS messages delivered from the SMSC 33 to the STP 31 according to the policy enforced by a policy manager (PM) 51. The PM 51 is an imbedded software in the SMS M/F 52 to implement a security policy to control the delivery of the SMS/MMS message to the mobile terminal 13, 17, 19. The SMSC M/F 52 monitors whether SMS/MMS messages violates the policy in the PM 51. If a SMS/MMS message that violates the security policy is detected, the SMSC M/F 52 filters out the SMS/MMS message. The PM 51 is updated to cure suspicious activities detected by the mobile terminals 13, 17, 19 upon receiving the alert of presence of the suspicious activities from the mobile terminals 13, 17, 19. The PM 51 may also be updated or changed by the network administrator.

The mobile terminal 13, 17, 19 downloads the SA software in the form of a SMS via a communication link of the network 11 from the SMSC 33. The SA software includes or otherwise implements a security policy. The SA software and/or the definition of the security policy may be downloaded to the mobile terminal periodically or upon the update of the PM. The security function in the mobile terminal is implemented by an execution of the SA software. Because the SA software including the policy used at the terminal is provided from the network side elements, PM 51 and SMSC 33, the security function performed in the mobile terminal can be changed or updated easily by the network administrator and, thereby, new suspicious activities can be promptly addressed.

Figure 2:
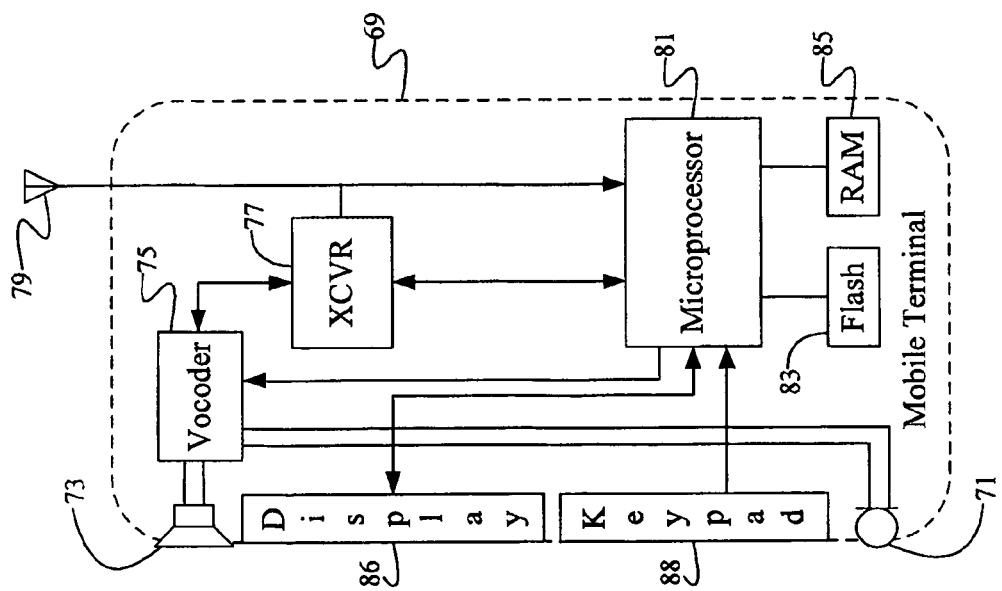
FIG. 2 is a functional block diagram illustrating a digital telephone implementation of the mobile terminal.

FIG. 2 is a functional block diagram illustrating a digital telephone implementation of the mobile terminal 13. The PDA mobile terminal 17 may have a similar structure, although some PDAs lack the elements for voice communication and instead will utilize different user interface (input/output) elements and may have more processing and memory capacity. Although the terminal 17 may be incorporated into a vehicle mounted mobile unit or into another device, such as a portable personal computer or PDA, for discussion purposes the illustration shows the terminal 17 in the form of a handset.

The handset embodiment of the mobile terminal 13 functions as a normal digital wireless telephone terminal. For that function, the terminal 13 includes a microphone 71 for audio signal input and a speaker 73 for audio signal output. The microphone 71 and speaker 73 connect to voice coding and decoding circuitry (vocoder) 75. For a voice telephone call, for example, the vocoder 75 provides two-way conversion between analog audio signals representing speech or other audio and digital samples at a compressed bit rate compatible with the digital protocol of the wireless telephone network communications.

For digital wireless communications, the terminal 13 also includes a digital transceiver (XCVR) 87, in this case, compatible with digital wireless packet communications with the NG BTS 17 and/or with a BTS 9 and RNC 7. The concepts discussed here encompass embodiments of the terminal 13 utilizing any digital transceivers that conform to current or future developed digital wireless communication standards. For example, the transceiver 87 could be a CDMA-2000, 1xRTT, or EVDO unit or the like designed for cellular or PCS operation or for WiFi/WLAN. The transceiver 87 provides two-way wireless communication of information, such as vocoded speech samples and digital message information. If compatible with the BTS 9, the communications via the transceiver could include both cellular digital voice and packet data communications. Via the BTS 25, the communications via the transceiver 87 all utilize IP packet transport. The transceiver also sends and receives a variety of signaling messages in support of the various services provided via the terminal 13 and the network 11. The transceiver 87 connects through RF send and receive amplifiers (not separately shown) to an antenna 88. The terminal 13 may include one or more additional transceivers, as shown in dotted line form, for operation in accord with an alternative digital standard.

As shown, the digital telephone handset 13 includes a display 86 for displaying messages on a menu generated by a client browser program or the like, call related information dialed and calling party numbers, etc. A keypad 88 enables dialing digits for voice and/or data calls and generating selection inputs keyed by the user based on the displayed menu. These elements are also used for display of menus and other information to the user and user input of selections, for various applications that involve the terminal and/or communications of the terminal through the network 11. Of course other user interface elements may be used, such as a stylus and touch sensitive display screen, as in a PDA.

A microprocessor 81 controls all operations of the mobile terminal 13. The microprocessor 81 is a programmable device. The mobile terminal 13 also includes flash type program memory 83 and/or a non-volatile Random Access Memory (RAM) 85, for storing various software routines and mobile configuration settings, such as Mobile Identification Number (MIN), etc. The program memory 83, for example, may store an operating system, vocoder software, client browser software, device driver software, call processing software, an IP protocol stack, etc. However, the program memory 53 will also include some storage dedicated to programming of the Operator of the network 11, which implements or includes the Security Agent (SA) software 93. The storage for the Operator programming will be secure, so that the programming can not be modified except by secure elements of the network 1 or by personnel of the network Operator. The network Operator software may implement any number of functions in relation to control of terminal communications through the network 11. As discussed more later, the stored software will include the software implementing the security functionalities, specifically including the network SA 93. The memories also store data, such as telephone numbers, server addresses and data input by the user via the keypad 77.

The structure and operation of the mobile terminal 13, as outlined above, were described to by way of example, only.

Figure 3:
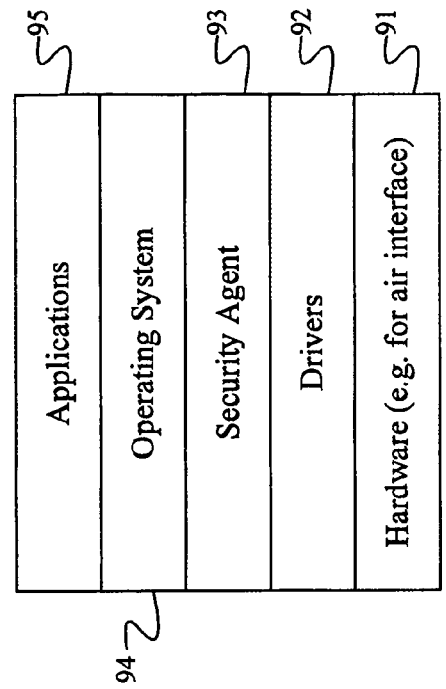
FIG. 3 is an alternate representation of the mobile terminal, with more emphasis on the software hierarchy.

FIG. 3 shows an alternate representation of a terminal 13, with more emphasis on the software hierarchy. In the representation of FIG. 3, the hardware 91 appears as the lowest layer functionality. The hardware for the network access technologies may be Wi-Fi or any of the available wireline technologies, or the hardware may utilize any wireless technology such as 1x or EVDO Rev A type implementations of the mobile terminal 13, in a manner analogous to FIG. 2. The mobile terminal will store the software implementing the functions of the other layers. For example, in the mobile terminal 13, the program memory 83 stores software components corresponding to the higher layers illustrated in FIG. 3.

As shown in FIG. 3, the software for the terminal 13 will include a first layer 92 of middleware for providing interfaces between the higher layer functions and the particular hardware 91 of the terminal 13. For example, this layer 92 will include device drivers for allowing the terminal processor 81 to control the particular communications hardware, user interface elements, etc. On top of the middleware layer 92 containing the device drivers, the terminal 13 will run an operating system 94. Examples of current operating systems include AMSS/REX, Linux, Windows and Symbian.

As outlined earlier, each terminal 13 of a customer of the network Operator will also run as least some software for that Operator's network 11. In the illustrated hierarchy, an operating system software 94 manages the sharing of the resource of the mobile terminal and provides operators with an interface used to access those resources. Of particular note, the network Operator's software includes at least a portion that specifically implements the SA 93. The SA software typically includes executable programming code and/or data to be used in implementing one or more security functions.

On top of the network Operator's software layer, the terminal 13 runs one or more client applications 95. In the mobile network environment, the applications may be BREW or IMS type applications or any number of other third party applications that utilize the hardware and communication functionalities of the terminal 13. The network Operator's software implements an Application Program Interface (API) that is published to the application software developers. The API provides a standard interface for communications between the applications at layer 95 and the middleware of the network Operator's software and thus with the lower layers of the software and hardware of the mobile terminal.

Because the applications layer 95 runs on top of the network Operator's software that contains the SA 93, all communications from the application layer 95 go through the SA 93. Incoming traffic may also go through the SA 93, before delivery to the appropriate application in layer module. In this way, it is possible for the SA 93 to examine all outgoing traffic (and possibly incoming traffic), compare the traffic to parameters/patterns of acceptable or unacceptable traffic, detect any suspicious activities and report such activities to the network and filter out any communications deemed harmful or malicious. In this way, the SA software effectively implements a "security policy" established and updated from time to time by the network/operator. There are many kinds of threats. The SA software, for example, would include a list of threats, respective characteristics of applications or applications traffic for use in identifying threats, and appropriate mechanisms to prevent such threats propagating harmful traffic from the terminal 13 into the network 11. In this way, the SA 93 will act as a reverse firewall to block communications from any of the applications in layer 95 that are deemed potentially harmful and/or to filter out any types or patterns of traffic deemed potentially harmful, based on the network Operator's security criteria.

For example, the SA software 93 will collect credentials from the application clients in software layer 95. Some application credentials may be identified as anti-network or spyware or the like, in which case, the SA software 93 would reject or block all communications to or from the respective application client.

The SA 93 monitors activities performed on the mobile terminal. The monitored activities include a launch, an operation and a close of programs executed on the mobile terminal 13, a use of SS7 based message such as SMS and MMS, activities of voice channels, and traffic of data links.

The SA software 93 detects suspicious activities in the monitored activities, based on traffic characteristics or patterns. For example, if the SA software 93 detects suspicious activities in the delivered messages, e.g. that an application is sending the same message to an excessive number of addresses (spam) or that an application is sending an excessive amount of IP traffic to one address (denial of service attack), it can block further outgoing traffic of that type, from a particular suspect application client and/or from the terminal 13 for some period of time. The suspicious activities also include UDP or TCP port scanning and port sweeps which may be done by hackers to compromise security of the network, a SYN flood which is a form of denial-of-service attack in which attacker sends a succession of SYN requests to a target's system, malformed packet attacks, and network mapping and inverse mapping attacks.

Once the mobile terminal detects the suspicious activities, the mobile terminal 13 sends the notification of the suspicious activities to the PM-embedded SMS M/F 52 via a radio network established through the network components such as BTS 25 and MSC 27.

The Security Agent software 93 also protects the mobile terminal 13 from privacy invasion. Some operating systems 94 in mobile terminals allow a low level access to the operating system itself, which causes others to remotely access the mobile terminal 13 and to query geographical location of the mobile terminal 13. This type access to the mobile terminal 13 can be a serious privacy invasion to the mobile terminal user, since the geographical location and activities of the mobile terminal user can be known to anonymous people. The Security Agent software 93 detects such predatory accesses to the mobile terminal and alerts the detection of the accesses to the network administrator via a radio link established through the network 11.

The Security Agent software 93 may enforce security measures on the suspicious activities in the mobile terminal. The Security Agent software 93 may restrict delivery of data which requires excessive bandwidth consumption that may accompany PING attack or SYN flood data. A launch, a download or removal of an application program to the mobile terminal may be prohibited, which may include the hazardous data. The Security Agent software 95 may restrict the mobile terminal user to access resources stored in the mobile terminal, such as a SMS service and a web browser. In addition, delivery or reception of SMS/MMS messages from specific phone numbers may be restricted, when the specific phone is identified as source of the hazardous data.

The Security Agent software 93 of the network Operator must be entirely tamper resistant. Typically, it will be separate from other parts of the software of the terminal. In a laptop, the Security Agent software 93 will reside on the air-card, rather than the laptop memory, because the user typically has access to the laptop memory. Other security software, e.g. for the user's protection, would normally be separate. In the laptop example, a personal firewall implemented at the application layer 95 would protect the device from harmful traffic coming from the network and would reside in a normal manner on the memory device(s) of the laptop.

If there are network operators that do not enforce security, for example against attacks on the wireless networks or against spyware, etc., then devices of customers of such operators will not have adequate security software for operation on the network 11, e.g. when the users of such devices roam into service areas or attempt to connect to the network 11. The Operator of network 11 may not want such untrusted devices operating on the network 11.

Figure 4:
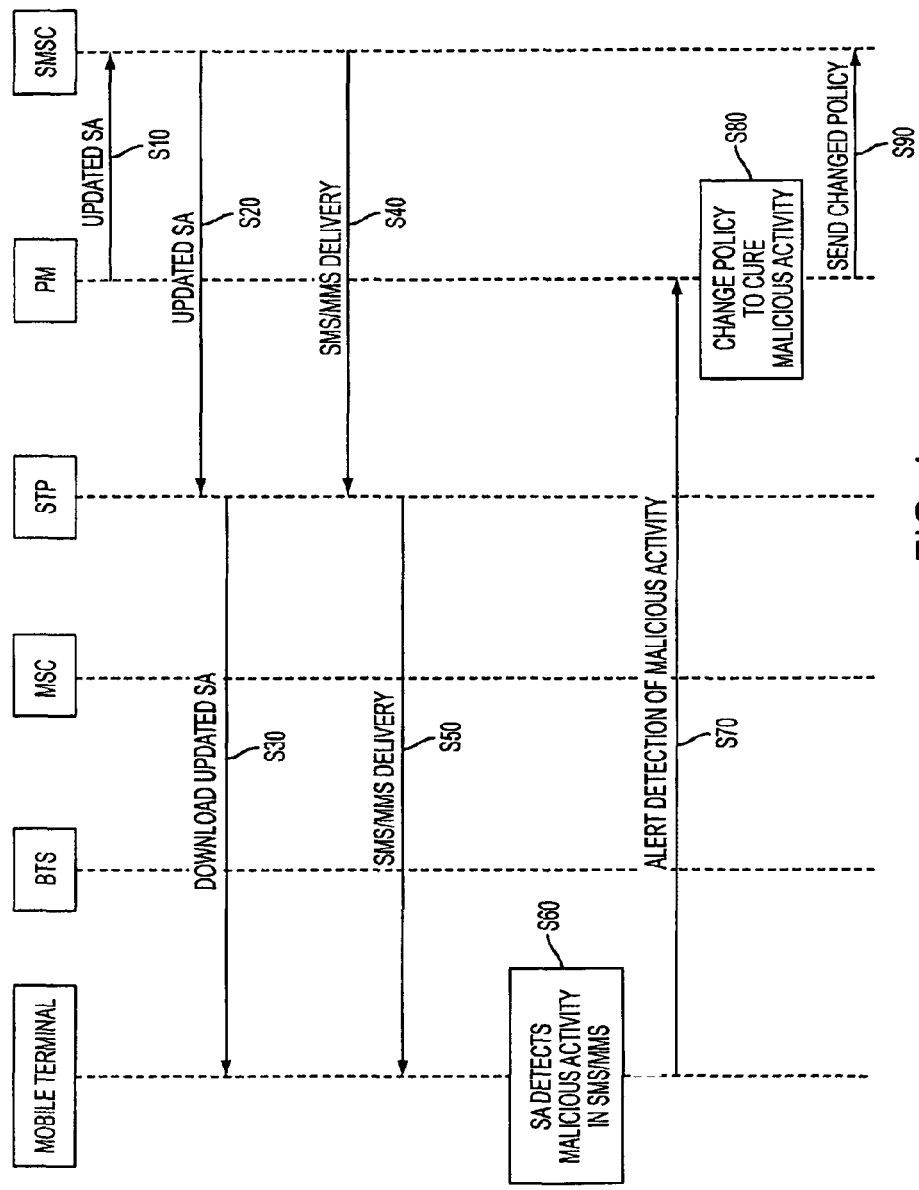
FIG. 4 is a call flow diagram illustrating an example of communications through the network of FIG. 1 implemented with security procedures.

FIG. 4 is a call flow diagram illustrating an example of communications through the network of FIG. 1 implemented with security procedures.

The PM 51 updates SA 93 periodically or randomly to reflect any change of the security policy on the SA 93. The change of policy may be performed following an alert on detection of suspicious activities in the mobile terminal 13, 17,19 or by the network administrator. The updated SA 93 is sent to the SMSC 52. (S10) The SMSC 52 converts the updated SA 93 into SMS or MMS message form and then sends the converted updated SA to the STP 31. (S20) The mobile terminal 13 receives the updated SA via the STP 31 and a communication link established through the MSC 27 and the BTS 25. (S30) The downloaded SA 93 in the SMS or MMS message is stored in the program memory 83. The SA 93 is stacked in the middleware layer under the operating system layer 94 in the program hierarchy illustrated in FIG. 3.

The SA 93 monitors call traffic delivered to the mobile terminal 13, before the updated SA is downloaded or after the updated SA is downloaded, while the scope and type of the monitoring will change after the updated SA is downloaded. The SMSC 52 delivers SMS/MMS messages to the STP 31 (S40), which conveys the SMS/MMS message through an established communication link between the mobile terminal 13 and the circuit switched network components via the MSC 27 and the BTS 25. (S50) The SA 93 monitors SMS/MMS messages delivered to the mobile terminal 13 and detects a presence of suspicious activities in the SMS/MMS messages. (S60) At the same time, the SA 93 enforces security measures on the suspicious activities in the mobile terminal according to the security policy provided from the PM 51. The security measures may include any or all of restricting bandwidth consumption, control of application program, restriction on time of access to resources on the mobile terminal, and restriction on phone number to contact.

When suspicious activities are detected by the SA 93, the mobile terminal 13 alerts the detection of suspicious activities to the PM via the communication link. (S70) The PM 51 may change the security policy to cure the detected suspicious activities. (S80) The SMS M/F 52 refers to the changed policy when it monitors and filters the SMS/MMS messages. (S90).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

PLMN: Public Land Mobile Network
SMS: Short Message Service
MMS: Multimedia Message Service
UDP: User Datagram Protocol
TCP: Transmission Control Protocol
PSTN: Public Switched Telephone Network
IP: Internet Protocol
PDA: Portable Digital Assistant
RAN: Radio Access Network
BTS: Base Transceiver System
MSC: Mobile Switching Center
MTSO: Mobile Telephone Switching Office
SCP: Service Control Point
STP: Signaling Transfer Point
SS7 : Signaling System 7
PDSN: Packet Data Serving Node
PPP: Point To Point
HA: Home Agent
MIP: Mobile IP
SMSC: Short Message Service Center
RAM: Random Access Memory
SA: Security Agent
MIN: Mobile Identification Number
API: Application Program Interface
DSUP: Device Software Update
PM: Policy Manager
BTS: Base Transceiver System
SMS M/F: Short Message Service Monitor/Filter

What is claimed is:

1. A method comprising steps of:
(a) monitoring, by a mobile terminal having a communication link with a circuit switched network, activities performed at the mobile terminal according to a security policy which is enforced by execution of security agent software provided from the circuit switched network via the communication link between the mobile terminal and the circuit switched network, wherein the security policy resides in the mobile terminal and is enforced by the mobile terminal;
(b) communicating detection of a suspicious activity defined by the security policy from the mobile terminal to a policy manager server of the circuit switched network when the suspicious activity is detected;
(c) changing the security policy, for the mobile terminal in response to the detection of the suspicious activity communicated from the mobile terminal, to cure the suspicious activity detected at the mobile terminal by the policy manager server of the circuit switched network;
(d) sending the changed security policy to the mobile terminal via the communication link between the mobile terminal and the circuit switched network such that the mobile terminal is able to receive and use the changed security policy to cure the suspicious activity; and
(e) filtering out call traffic including SMS or MMS messages sent from/to be delivered to the mobile terminal relating to the suspicious activity, by an SMSC filter of the circuit switched network, according to the changed security policy.

2. The method of claim 1, wherein the suspicious activity includes one or more of a PING attack, a UDP/TCP port scanning, a SYN flood, a malformed packet attack, an inverse network mapping, and a predatory remote access to the mobile terminal.

3. The method of claim 1, further comprising:
enforcing, by the mobile terminal, a security measure on the detected suspicious activity according to the changed security policy.

4. A method comprising steps of:
monitoring, by a mobile terminal having a communication link with a circuit switched network, activities performed at the mobile terminal according to a security policy enforced by execution of security agent software downloaded from the circuit switched network via the communication link with the circuit switched network;
communicating detection of a suspicious activity including SMS or MMS messages defined by the security policy from the mobile terminal to a policy manager server of the circuit switched network when the suspicious activity is detected;
changing the security policy, for the mobile terminal in response to the detection of the suspicious activity communicated from the mobile terminal, to cure the suspicious activity detected at the mobile terminal by the policy manager server of the circuit switched network; and
enforcing, by the policy manager of the circuit switched network, via an SMSC filter, a security measure of filtering SMS or MMS messages sent from/to be delivered to the mobile terminal according to the security policy changed based on the detection of the suspicious activity communication from the mobile terminal.

5. The method of claim 4, wherein the security policy is updated to restrict delivery, from the circuit switched network to the mobile terminal, of data causing the suspicious activities.

6. The method of claim 4, wherein the mobile terminal enforces a security measure according to the security policy which includes one or more of:
restricting bandwidth consumption, control of application program, restriction on time of access to resources on the mobile terminal, and restriction of delivery or reception of messages from specific phone numbers.

7. A mobile terminal comprising:
a microprocessor; and
a memory storing security agent software, provided from a circuit switched network via a communication link between the mobile terminal and the circuit switched network;
wherein execution of the security agent software by the microprocessor causes the mobile terminal to perform functions to:
monitor activities performed by the mobile terminal according to a security policy which is enforced by the execution of the stored security agent software;
communicate detection of a suspicious activity defined by the security policy from the mobile terminal to a policy manager server of the circuit switched network when the suspicious activity is detected, wherein the security policy is changed for the mobile terminal in response to the detection of the suspicious activity communicated from the mobile terminal by the policy manager sever of the circuit switched network to cure the detected suspicious activity;
receive, by the mobile terminal, the changed security policy via the communication link between the mobile terminal and the circuit switched network and enforcing, by the mobile terminal, a security measure on a suspicious activity according to the changed security policy to cure the suspicious activity; and
filter out, by the security agent software, call traffic delivered to/to be sent from the mobile terminal, wherein the filtered out call traffic is call traffic including SMS or MMS messages causing the suspicious activity according to the changed security policy.

8. A system comprising:
a non-transitory medium in a mobile terminal having a communication link with a circuit switched network, the non-transitory medium storing security agent software in the mobile terminal, wherein execution of the security agent software by the mobile terminal causes the mobile terminal to perform monitoring activities and to communicate a detection of a suspicious activity to the circuit switched network via the communication link with the circuit switched network when the suspicious activity is detected,
wherein the security agent software is downloaded from the circuit switched network; and
an SMSC filter for controlling delivery of SMS or MMS data for the mobile terminal according to a security policy,
wherein the security policy is updated for the mobile terminal in response to the detection of the suspicious activity communicated from the mobile terminal, to filter out SMS or MMS data which relates to the suspicious activity and cure the suspicious activity at the mobile terminal, upon reception of the communicated detection of the suspicious activity from the mobile terminal, and
wherein the updated security policy is sent to the mobile terminal such that the security agent software causes the mobile terminal to enforce a security measure on a suspicious activity according to the updated security policy to cure the suspicious activity.

9. The system of claim of claim 8, further comprising:
a policy manager server for updating the security agent software to reflect the updated security policy and for sending the updated security agent software to the mobile terminal.

10. The system of claim 8, wherein the security agent is configured to detect suspicious activities including: a PING attack, a UDT/TCP port scanning, a SYN flood, a malformed packet attack, an inverse network mapping, and a predatory remote access to the mobile terminal.

11. The system of claim 9, wherein the policy manager server is a separate entity from the mobile terminal and communications with the mobile terminal via a wireless communication link.

* * * * *